Patented Oct. 16, 1923.

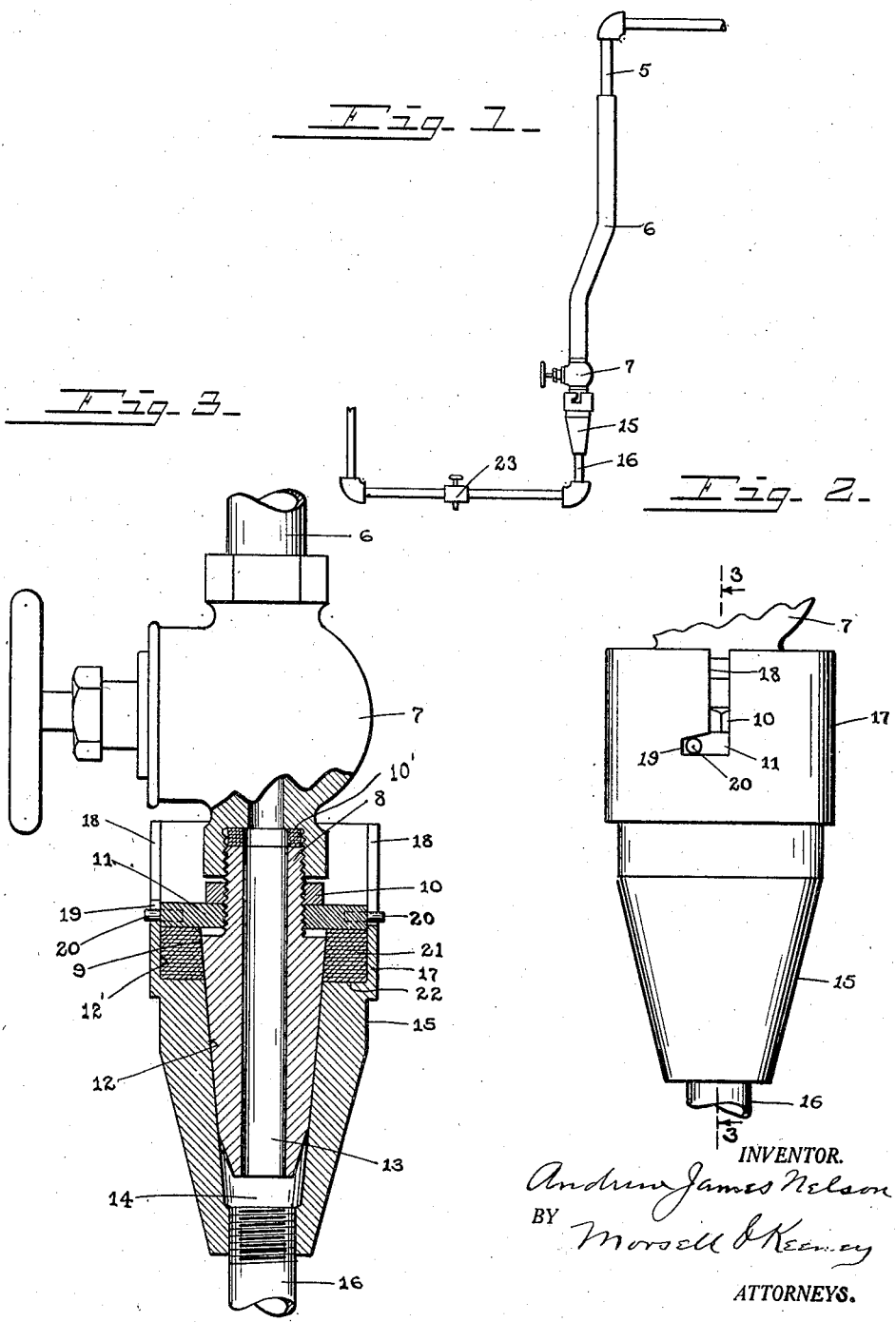

1,471,055

UNITED STATES PATENT OFFICE.

ANDREW J. NELSON, OF MILWAUKEE, WISCONSIN.

COUPLING.

Application filed July 14, 1922. Serial No. 574,988.

*To all whom it may concern:*

Be it known that I, ANDREW JAMES NELSON, a citizen of the United States, and resident of Milwaukee, in the county of Milwaukee and State of Wisconsin, have invented new and useful Improvements in Couplings, of which the following is a description, reference being had to the accompanying drawings, which are a part of this specification.

This invention relates to certain new and useful improvements in couplings, and refers more particularly to what may be termed a safety device.

It is one of the objects of this invention to provide a coupling that is capable of varied uses where it is desired to provide a breakable connection between two members.

One of the uses of my invention is in connection with the hose on steam locomotives that is used in spraying the coal and washing the decks. This hose taps into the water supply for the boiler and oftentimes the valve therein does not properly seat, permitting the same to leak, and as the water is at a hot temperature, numerous serious accidents result therefrom. My invention is designed to eliminate this danger by providing a female coupling member adapted to receive the nozzle on the end of the hose when the same is not in use, the receiving member and nozzle having a water-tight connection and said receiving member being connected with a source of water supply so that the leakage will not be wasted.

A further object of this invention is to provide a coupling device of the class described that is capable of production at a comparatively low cost, and adapted for many uses, as for providing means for connecting various types of attachment with a source of fluid supply.

A still further object of this invention is to provide a coupling device of the class described, which may be readily connected or disconnected and which will, when connected, have an absolutely fluid-tight joint.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated one complete example of the physical embodiment of my invention constructed according to the best mode I have so far devised for the practical application of the principles thereof, and in which:

Figure 1 is a side view illustrating two pipe lines connected together by my improved coupling device;

Figure 2 is a side view of my improved coupling device; and

Figure 3 is a sectional view taken therethrough on the line 3—3 of Figure 2.

Figure 1 illustrates my invention as applied to a steam locomotive in which a pipe line 5 is tapped into the boiler water-supply, not shown, and has a flexible hose 6 carried thereby with its free end closed by any desired type of valve means 7. Secured to the discharge end of the valve 7 is the threaded boss 8 of a nozzle member 9, which engages the packing 10' to form a tight connection therebetween.

The threaded portion of the nozzle member 9 also has a collar 11 threaded thereon which will be later described. The nozzle 9 outwardly of the shoulder formed by the threaded stem has its outer wall tapered, as at 12, the nozzle member being centrally longitudinally bored, as at 13, to provide a passage for the fluid from the hose 6. The nozzle 9 forms a male member which is engageable within the tapered bore 14 of a female member 15, the smaller end of the bore 14 having a lead off pipe 16 connected therewith and the upper larger end thereof leading into a counter-bored enlargement 17 of the female member.

The enlargement 17 has two diametrically opposed vertical slots or openings 18 in the wall thereof and communicating with its top edge and having their lower ends communicating with offset notches or recesses 19 forming bayonet openings, into which radially extending diametrically opposed pins 20, carried by the collar 11, are engageable to releasably lock the nozzle in the female member. In order to insure a fluid-tight connection between the nozzle and female member, a washer or gasket 21 is confined between the underside of the collar 11, and the shoulder 22 formed between the counter-bore of enlargement 17 and bore 14 so that when the collar 11 is turned downwardly the gasket 21 will be forced outwardly to form a tighter joint. A jam nut 10 holds the collar 11 in adjusted position.

As best shown in Figure 1, the drain or lead off pipe 16 is connected with any desired storage means, not shown. In the case of the locomotive, said pipe leads to the tender tank, not shown. A drain cock 23 is positioned within the pipe 16 to permit the complete draining thereof in cold weather to prevent damage thereto due to freezing.

While, in the accompanying drawing, my coupling device has been illustrated as used in connection with the coupling of two pipes, it will be readily appreciated that the same may be utilized in any position whereby it is desired to connect a supply pipe with an attachment to provide a fluid-tight joint therebetween.

What I claim as my invention is:

1. A device of the class described, comprising a nozzle having a tapered discharging end, and a straight portion at its opposite end, a collar adjustably surrounding the straight portion and having trunnions, a receiving member having a tapered bore in which the discharging end of said nozzle is engageable and having a counterbore in its upper portion in which said collar extends, and cooperating bayonet slot means between said collar trunnions and the receiving member for readily releasably securing the nozzle in said member.

2. A device of the class described, comprising a nozzle having a tapered discharging end, and a threaded straight portion at its opposite end, a collar surrounding and adjustably threaded on the straight portion and having opposite trunnions, a receiving member having a tapered bore in which the discharging end of said nozzle is engageable and having a counterbore in its upper portion in which said nozzle collar extends, said counterbore forming a shoulder where it connects with said tapered bore, said receiving member also having opposite bayonet slots into which the trunnions extend for releasably securing the nozzle in said member, a packing member confined between said collar and shoulder to provide a fluid tight joint, and a nut threaded on said nozzle member and engaging the collar.

In testimony whereof, I affix my signature.

ANDREW J. NELSON.